US012717859B2

(12) United States Patent
Ogden et al.

(10) Patent No.: US 12,717,859 B2
(45) **Date of Patent: *Aug. 25, 2026**

(54) ALLOCATING COMMUNICATION RESOURCES VIA INFORMATION TECHNOLOGY INFRASTRUCTURE

(71) Applicant: GOOGLE LLC, Mountain View, CA (US)

(72) Inventors: Scott Ogden, Chippendale (AU); Nabil Naghdy, Mountain View, CA (US)

(73) Assignee: GOOGLE LLC, Mountain View, CA (US)

(*) Notice: Subject to any disclaimer, the term of this patent is extended or adjusted under 35 U.S.C. 154(b) by 227 days.

This patent is subject to a terminal disclaimer.

(21) Appl. No.: 17/730,183

(22) Filed: Apr. 26, 2022

(65) Prior Publication Data

US 2022/0253499 A1 Aug. 11, 2022

Related U.S. Application Data

(63) Continuation of application No. 16/096,175, filed as application No. PCT/US2016/029209 on Apr. 25, 2016, now Pat. No. 11,314,831.

(51) Int. Cl.

| | |
|---|---|
| ***G06F 16/9537*** | (2019.01) |
| ***G06F 16/9538*** | (2019.01) |
| ***G06F 16/958*** | (2019.01) |

(52) U.S. Cl.

CPC ...... *G06F 16/9537* (2019.01); *G06F 16/9538* (2019.01); *G06F 16/958* (2019.01)

(58) Field of Classification Search

CPC . G06F 16/9537; G06F 16/9538; G06F 16/958

See application file for complete search history.

(56) References Cited

U.S. PATENT DOCUMENTS

| | | | |
|---|---|---|---|
| 7,730,397 | B2 | 6/2010 | Tischer et al. |
| 7,747,962 | B2 | 6/2010 | Othmer et al. |

(Continued)

FOREIGN PATENT DOCUMENTS

| | | | |
|---|---|---|---|
| CN | 103064904 | A | 4/2013 |
| CN | 104252525 | A | 12/2014 |

(Continued)

OTHER PUBLICATIONS

Examination Report for EP Appln. Ser. No. 16720307.4 dated Jun. 19, 2019 (10 pages).

(Continued)

*Primary Examiner* — Miranda Le

(74) *Attorney, Agent, or Firm* — MARSHALL, GERSTEIN & BORUN LLP

(57) ABSTRACT

Systems and methods to reduce latency in a graphical environment are described. The systems receives location information of a computing device and identifies content items that satisfy a boundary condition formed from the location information. The system selects content items from categories using a load balancing technique. The system selects, responsive to a request having no keywords, a content item object using values generate with an offline process. The system provides the content item object to the computing device to cause the computing device to render the content item object in the graphical environment.

20 Claims, 5 Drawing Sheets

(56) References Cited

U.S. PATENT DOCUMENTS 7,882,046 B1 * 2/2011 Kizhakkekalathil ... G06N 20/00 706/12
7,940,285 B2 5/2011 Would et al.
7,949,562 B2 5/2011 Collins et al.
8,099,109 B2 * 1/2012 Altman ................. H04L 51/222 455/457
8,185,538 B2 5/2012 Delli Santi et al.
8,315,953 B1 11/2012 Hansen et al.
8,335,524 B2 * 12/2012 Shutter .................. G06Q 30/02 455/456.3
8,340,895 B2 12/2012 Robinson et al.
8,583,524 B2 * 11/2013 Selinger ............. G06Q 30/0246 705/35
8,832,121 B2 * 9/2014 Smith ................. H04M 3/4872 707/754
8,843,484 B2 9/2014 Gu et al.
9,363,544 B2 6/2016 Tomita et al.
9,401,100 B2 7/2016 Forsblom et al.
9,449,333 B2 9/2016 Jakobson et al.
9,760,541 B2 * 9/2017 Richman ............... G06F 16/972
9,779,415 B2 * 10/2017 McElfresh ......... G06Q 30/0277
9,791,292 B2 10/2017 Beyeler et al.
9,824,387 B2 * 11/2017 Haver ................ G06Q 30/0207
9,928,627 B2 * 3/2018 Fulks .................... G06T 11/206
10,075,754 B2 * 9/2018 Sheehan ................ H04N 21/84
10,099,138 B2 * 10/2018 Ellis ....................... G06Q 30/02
10,127,564 B2 * 11/2018 Heath .................... G06Q 50/01
10,223,703 B2 * 3/2019 Buchalter .............. G06Q 30/02
10,223,713 B2 * 3/2019 LaJoie ............. H04N 21/25883
10,325,283 B2 * 6/2019 Karande ............ G06Q 30/0246
10,650,408 B1 * 5/2020 Andersen ........... G06Q 30/0249
11,314,831 B2 4/2022 Ogden et al.
2001/0044791 A1 11/2001 Richter
2006/0253481 A1 * 11/2006 Guido ................ G06Q 30/0257
2007/0027768 A1 * 2/2007 Collins ............. G06Q 30/0263 705/14.55
2007/0136533 A1 6/2007 Church et al.
2007/0250468 A1 * 10/2007 Pieper ................. G06F 16/9535
2008/0072139 A1 * 3/2008 Salinas ............... G06F 16/9577 715/764
2008/0147484 A1 * 6/2008 Davis ..................... G06Q 30/02 705/14.42
2008/0215475 A1 9/2008 Ramer et al.
2009/0089141 A1 * 4/2009 Lara ....................... G06Q 30/02 705/14.43
2009/0089280 A1 4/2009 Raghunathan et al.
2009/0198607 A1 8/2009 Badger et al.
2009/0327151 A1 * 12/2009 Carlson ............. G06Q 30/0252 705/14.23
2010/0036970 A1 2/2010 Sidi et al.
2010/0114654 A1 * 5/2010 Lukose .................. G06Q 30/00 705/14.54
2010/0168996 A1 7/2010 Bourque et al.
2010/0262449 A1 10/2010 Monteforte et al.
2011/0035397 A1 2/2011 Joshi et al.
2011/0055024 A1 3/2011 Shen
2011/0288907 A1 * 11/2011 Harvey .............. G06Q 10/0639 705/7.29
2012/0046861 A1 * 2/2012 Feldbauer .......... G01C 21/3682 701/426
2012/0166432 A1 6/2012 Tseng
2012/0221548 A1 * 8/2012 Delli Santi ........... G06F 16/951 707/750
2013/0044137 A1 2/2013 Forsblom et al.
2013/0080620 A1 * 3/2013 Cook ................. H04N 21/2408 709/224
2013/0218683 A1 * 8/2013 Hannan .............. G06Q 30/0261 705/14.58
2014/0025486 A1 1/2014 Bigby et al.
2014/0164394 A1 6/2014 Maru et al.
2014/0359537 A1 12/2014 Jackobson et al.
2015/0012355 A1 * 1/2015 Efrat .................. G06Q 30/0254 705/14.52
2015/0120455 A1 * 4/2015 McDevitt ........... G06Q 30/0261 705/14.58
2015/0149287 A1 * 5/2015 Brown .............. G06Q 30/0267 705/14.58
2015/0199362 A1 7/2015 Rehman
2015/0213488 A1 7/2015 Karande et al.
2016/0078496 A1 3/2016 Lewis et al.
2016/0173942 A1 6/2016 Ransom et al.
2016/0335670 A1 11/2016 Eraker et al.
2017/0272505 A1 * 9/2017 Smith ................... H04L 67/306
2021/0319476 A1 * 10/2021 McDevitt .............. H04L 67/535

FOREIGN PATENT DOCUMENTS

CN 104380293 A 2/2015
CN 105339935 A 2/2016
WO WO-2016/044152 A1 3/2016

OTHER PUBLICATIONS

First Office Action for CN Appin. Ser. No. 201680079055.3 dated Apr. 29, 2021 (29 pages).
International Preliminary Report on Patentability, Ch. II, for PCT Appin. Ser. No. PCT/US2016/029209 dated Jun. 25, 2018 (20 pages).
International Search Report and Written Opinion for PCT Appin. Ser. No. PCT/US2016/029209 dated Oct. 27, 2016 (14 pages).
Office Action issued in Chinese Patent Application No. 201680079055.3, dated Oct. 18, 2021.
Search Report issued in Chinese Patent Application No. 2016800790553, dated Apr. 29, 2021.

* cited by examiner

ALLOCATING COMMUNICATION RESOURCES VIA INFORMATION TECHNOLOGY INFRASTRUCTURE

BACKGROUND

Information can be displayed in a graphical environment, a web page or another interface by a computing device. The graphical environment or web pages can include text, images, video, or audio information provided by the entities via an application server or web page server for display on the Internet. Additional content item objects can also be provided by third parties for display on the web pages together with the information provided by the entities. Thus, an individual viewing a graphical environment can access the information that is the subject of the web page, as well as selected third party content item objects that may or may not be related to the subject matter of the web page. However, due to the large number of available content item objects and the resource intense nature of the electronic graphical environment, it may be challenging to efficiently select and provide content item objects for display in the graphical environment.

SUMMARY

Systems and methods of the present disclosure provide low-latency techniques of selecting and delivering content item objects in a graphical environment. When providing information resources such as a web page to a computing device, it is often desirable to provide additional content item objects that are appropriate and complementary to the resource. For example, on a web page about a particular location, it may be desirable to provide additional content item objects such as images of the location or points of interest at the location. In the case of textual resources, such content may be identified based upon an analysis of context provided by the text of the resource to identify that content which is likely to be most relevant.

However, difficulties may arise where the information resource is not textual in nature. For example, where the resource is a graphical environment (e.g., a map, a two or three-dimensional simulation), context (as is provided by text in a textual resource) may not be available. Further, non-textual resources can have large bandwidth requirements relative to textual resources, and may be updated frequently and unexpectedly by the computing device during interaction with the resource. As such, a latency which may be acceptable for textual resources may not be acceptable for information resources which are graphical in nature.

System and methods of the present solution provide low-latency techniques of selecting and delivering content item objects in a graphical environment. In one implementation, a data processing system of the present solution can select content item objects responsive to a search for a location, and provide the selected content item objects for display on or alongside a digital map. The data processing system can identify content items that correspond to locations that would be within an active viewing area or a certain extent of a digital map displayed on a display device. For example, if the map is centered on San Francisco, the viewable area can include several neighboring cities based on the zoom level. The data processing system can then identify the content items that correspond to locations within the viewable area.

At least one aspect of the present disclosure is directed to a method of reducing latency in a graphical environment. In one implementation, the method includes a data processing system receiving location information of a computing device. The method can include the data processing system determining a first plurality of content items each having an entry in a location field that satisfies a boundary formed from the location information. The method can include the data processing system selecting, from the first plurality of content items, a second plurality of content items. The second plurality of content items can be assigned to a first category of a plurality of categories based on a load balancing technique. The method can include the data processing system retrieving, from a data structure stored in memory, a plurality of values corresponding to the second plurality of content items. The plurality of values can be generated using an offline process and indicating a likelihood of interaction. The method can include the data processing system selecting, responsive to a content request having no keywords, a content item object from the second plurality of content items based on the plurality of values. The content request may include or correspond to location information without additional keywords such as topical keywords, concepts, vertical information, or entities. The method can include the data processing system providing, via a network, the content item object to the computing device to cause the computing device to render the content item object on an electronic map in the graphical environment.

In one implementation, the data processing system forms the boundary based on a resolution of the graphical environment. The data processing system can identify a zoom level of the electronic map in the graphical environment rendered by the computing device. The data processing system can form the boundary based on the zoom level to identify the first plurality of content items viewable via the graphical environment rendered by the computing device.

In some cases, the data processing system receives an indication to zoom the electronic map. The data processing system can remove, responsive to the indication, one or more content items from the first plurality of content items that are not viewable.

The data processing system can determine a duration and a resource availability for each of the first plurality of content items. The data processing system can input the duration and the resource availability into the load balancing technique to categorize the first plurality of content items into a plurality of categories. The first category can rank higher than a second category based on an output of the load balancing technique.

The data processing system can access an impression record data structure for the first plurality of content items to retrieve, from a view field, a priority value for each of the first plurality of content items. The data processing system can determine the second plurality of content items from the first plurality of content items based on a combination of the priority value.

In some cases, the data processing system can use an offline process to determine the plurality of values based on historical terms input by a plurality of different computing devices for the location. The data processing system can use the offline process to the plurality of values based on a number of HTML requests to access a resource corresponding to each of the second plurality of content items. The data processing system can use the offline process to determine the plurality of values based on a Doppler radar forecast for the location.

The data processing system can select the content item object using a Bayes classifier. The data processing system can input only values generated by the offline process into a Bayes classifier to select the content item object. The data processing system can identify a bandwidth availability for the computing device. The data processing system can use an online process to generate, responsive to the bandwidth satisfying a threshold, a score for each of the second plurality of content items indicating a likelihood of interaction. The data processing system can input the plurality of values generated using the offline process and the score generated using the online process into a Bayes classifier to select the content item object.

The data processing system can convert a portion of the electronic map into structured content configured to display the content item object. The data processing system can receive the content request from the computing device, the content request generated responsive to a location search query comprising a city, a town, or a state, the search query lacking keywords.

Another aspect of the present disclosure is directed to a system to reduce latency in a graphical environment. The system can include a data processing system that includes one or more processors and a data repository in memory. The data processing system can further include one or more of a location engine, a content selector, a mapping engine, or a resource monitor. The location engine can receive location information of a computing device. The content selector can determine a first plurality of content items each having an entry in a location field that satisfies a boundary formed from the location information. The content selector can select, from the first plurality of content items, a second plurality of content items that are assigned to a first category of a plurality of categories based on a load balancing technique. The content selector can retrieve, from the data repository, a plurality of values corresponding to the second plurality of content items. The plurality of values generated using an offline process and indicating a likelihood of interaction. The content selector can select, responsive to a content request lacking a keyword, a content item object from the second plurality of content items based on the plurality of values. The content selector can provide, via a network, the content item object to the computing device to cause the computing device to render the content item object on an electronic map in the graphical environment.

Another aspect of the present disclosure is directed to a method for displaying content within a graphical information resource displayed on a computing device. The method can include a data processing system receiving an indication of an extent associated with the graphical information resource. The data processing system can select from, a set of content items each having a location, a first subset of content items based on the extent. The data processing system can determine relative classifications for the content items within the first subset. The data processing system can select, from the first subset, a second subset of content items based upon the relative classifications. The data processing system can provide the second subset of content items for display within the graphical information resource. By selecting content items based upon the extent and further classifying only those content items within the first subset for selection of content items to be displayed, processing required by the data processing system to display relevant and appropriate content items within a graphical information resource is reduced.

In some cases, the extent can refer to an area or a volume, and the graphical information resource can include a map. The data processing system can determine relative classifications for the content items within the first subset at least partially based upon comparisons between comparable parameters associated with the content items in the first subset. By providing content items with parameters which may be compared as between respective content items (i.e., comparable parameters), the data processing system can select relevant content items efficiently and in the absence of other, extrinsic context.

In some cases, the data processing system determines a classification for each of the content items in the first subset by obtaining from a search term database a search term associated with the extent. At least two of the content items in the first subset can include a descriptive parameter, and a classification of a content item can be improved if that content item comprises a descriptive parameter with a value associated with the search term. By obtaining search terms based upon the extent, useful context may be obtained even where not natively provided within the information resource, so that relevant content may be more efficiently determined and provided.

In some cases, the data processing system determines a classification of each content item by processing one or more of the set of parameters with a naïve Bayes classifier. The data processing system can select a first subset of content items based on the extent by selecting at least one content item having a location within the extent. The data processing system can selecting a first subset of content items based on the extent by selecting at least one content item having a location within a predetermined distance of the a boundary of the extent.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Figure 1:
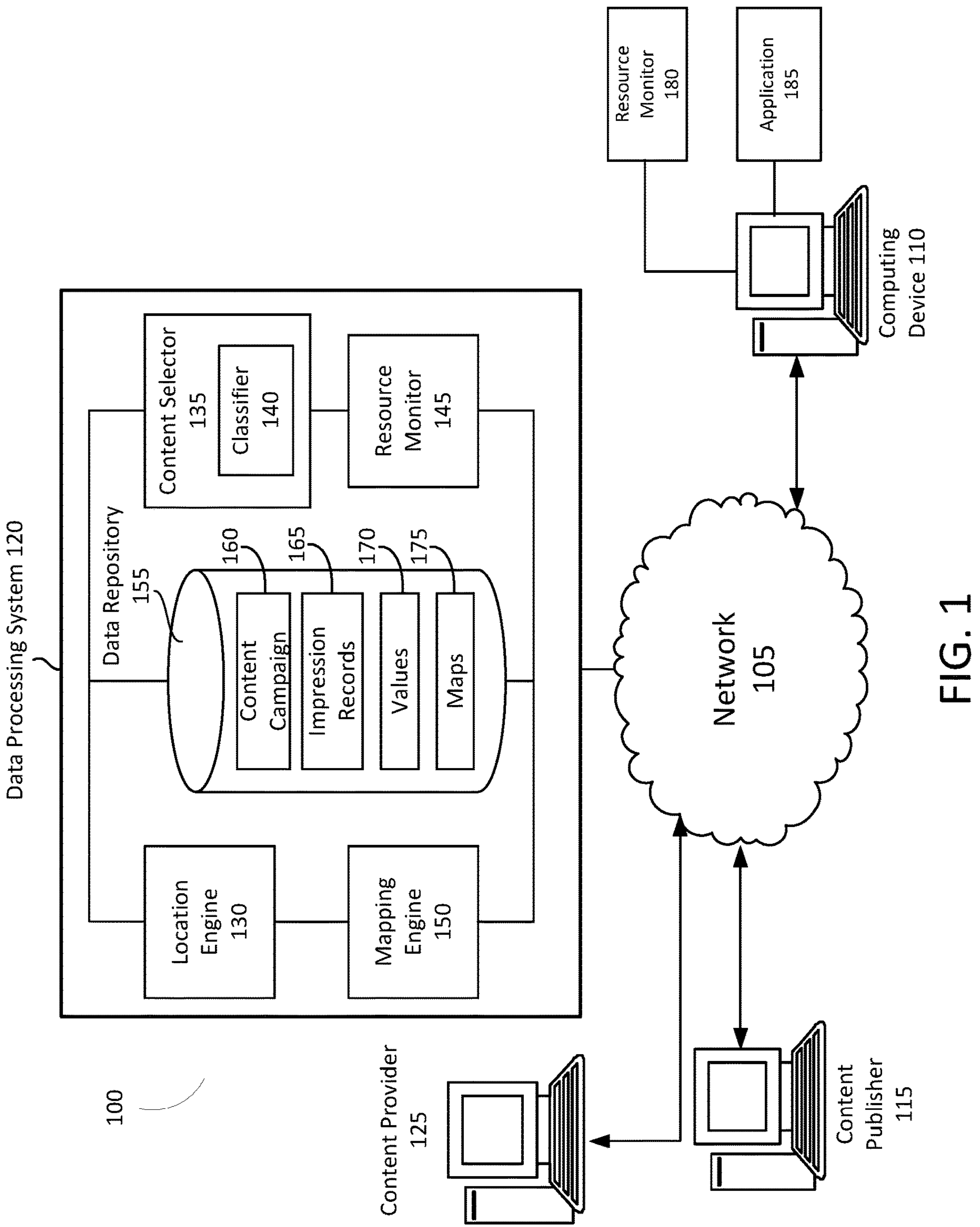
FIG. 1 is an illustration of a system to reduce latency in a graphical environment in accordance with an implementation.

Systems and methods of the present disclosure are directed to delivering content on a graphical environment. In particular, the systems and methods provide low-latency techniques of selecting content item objects responsive to a search for a location, and providing the selected content item objects for display on or alongside a digital map.

Content item objects can be selected based on textual criteria such as keywords. For example, a content selection system can select content item objects responsive to a search query that includes keywords or keywords associated with main content in a webpage. However, non-textual resources such as graphical environments or digital maps may not include textual criteria such as keywords. Thus, a search for a location on the digital map may only include an address or a city without additional keywords. Due to the large graphical content of the digital map and limited computing and network resources, it may be challenging to select content item objects for display on digital maps without impacting latency.

The present solution is directed to systems and methods of selecting content item objects responsive to a search for a location, and providing the selected content item objects for display on or alongside a digital map. In one implementation, a data processing system identifies content items that correspond to locations that would be within an active viewing area of a digital map displayed on a display device. For example, if the map is centered on San Francisco, the viewable area can include several neighboring cities based on the zoom level. The data processing system can then identify the content items that correspond to locations within the viewable area.

Upon identifying the viewable content items, the data processing system can perform a lookup to determine whether these content item objects have been previously provided for display on the computing device. If the content item has not been previously provided for display on the computing device, then the data processing system can assign a higher selection priority to the content item.

The data processing system can perform a load balancing technique to avoid loading a resource. The load balancing technique can avoid prematurely loading a resource to the determinant of another available resource. The load balancing technique can include a smoothing technique. For example, the smoothing technique can load balance by evenly distribute content item impressions (e.g., the number of times the content item has been viewed) based on a number of times that the content item is to be displayed and a remaining duration during which it is desired to display the content item. For example, the data processing system can determine a value based on a remaining number of times the content item is to be displayed divided by the time remaining. The data processing system can then group "campaigns" of content items into five groups based on these values, where the group with the highest value corresponds to the highest priority for selection purposes. It will be appreciated that a number of times a content item is to be displayed may be determined in any of a number of ways, and may be determined based upon a budget associated with that content item.

The data processing system can receive a request for content from a computing device. When the data processing system receives the request, the data processing system can determine the highest level group with content items having locations that are viewable. The data processing system can further identify the high priority content items in this group (e.g., content items that have not yet been provided for display on the computing device). The data processing system can then input features or scores for the content items into a classifier (e.g., a Naïve Bayes Classifier) to select the content items from the highest group/priority pairing. To minimize latency in the process of providing content items in real-time for display on a graphical environment, the data processing system can precompute some of the scores and features in an offline process. The data processing system can then input a combination of predetermined scores and real-time scores into the classifier responsive to a request for the content item. The scores or features can be based on the following:

- Identify search terms that are searched for near a location. For example, if the data processing system historically receives a number or frequency of search queries for Gardens near Fendalton, then when the data processing system receives a search query for just "Fendalton", the data processing system can increase the likelihood that content items for Garden shops are selected.
- Increase likelihood of selection for content items corresponding to the suburb/area around the location, and if the search area is too specific (e.g. a residential address) then distance to the search area can be used in the ranking content items.
- Increase likelihood of selection of content items corresponding to popular stores based on foot traffic.
- Number of times the user has seen the content item (lower is better)
- Number of users who have seen the content item (lower is better)
- Number of user visits to the website of the campaign in the last 30 days (higher is better)
- Number of user visits to a store owned by the campaign owner in the last 30 days (higher is better)
- Is the user interested in the category of the campaign (e.g. boats) (yes is better)
- When did the user last research the category of the campaign (e.g. boats) (sooner is better)
- Are the environmental conditions (Time of day, weather, etc.) suited to the campaign (more matches are better)
- An engagement rate on previous showings of the content item. The engagement rate may be, for example, the number of times that a user engages with the content item (e.g., clicks, mouse-overs, selections, etc.) divided by the number of times the content item is shown.

FIG. 1 illustrates an example system 100 for reducing latency in a graphical environment provided via information technology infrastructure. The system 100 can include content selection infrastructure. The system 100 can include a data processing system 120 communicating with one or more of a content provider 125, content publisher 115 or computing device 110 via a network 105. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be displayed on at least one computing device 110, such as a laptop, desktop, tablet, personal digital assistant, smart phone, or portable computers. For example, via the network 105 a user of the computing device 110 can access web pages provided by at least one web site operator or content publisher 115. In this example, a web browser of the computing device 110 can access a web server of the web site operator of content publisher 115 to retrieve a web page for display on a monitor of the computing device 110. The web site operator or content publisher 115 generally includes an entity that operates the web page. In one implementation, the web site operator or content publisher 115 includes at least one web page server that communicates with the network 105 to make the web page available to the computing device 110.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include at least one data processing system 120. The data processing system 120 can include at least one logic device such as a computing device having a processor to communicate via the network 105, for example with the computing device 110, the web site operator or content publisher computing device 115 (or content publisher 115), and at least one content provider computing device 125 (or provider device 125 or content provider 125). The data processing system 120 can include at least one server. For example, the data processing system 120 can include a plurality of servers located in at least one data center. The data processing system 120 can include multiple, logically-grouped servers and facilitate distributed computing techniques. The logical group of servers may be referred to as a server farm or a machine farm. The servers can also be geographically dispersed. A machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralizing the servers and storage systems and coupling them with advanced system management tools allows more efficient use of server resources.

The data processing system 120 can include a content placement system having at least one server. The data processing system 120 can include at least one location engine 130, at least one content selector 135, at least one classifier 140, at least one resource monitor 145, at least one mapping engine 150, and at least one data repository 155. The location engine 130, content selector 135, classifier 140, resource monitor 145, and mapping engine 150 can each include at least one processing unit or other logic device such as programmable logic array engine, or module configured to communicate with the database repository or database 155. The location engine 130, content selector 135, classifier 140, resource monitor 145, mapping engine 150 and data repository 155 can be separate components, a single component, or part of the data processing system 120. The system 100 and its components, such as a data processing system 120, may include hardware elements, such as one or more processors, logic devices, or circuits.

The data processing system 120 can obtain anonymous computer network activity information associated with a plurality of computing devices 110. A user of a computing device 110 can affirmatively authorize the data processing system 120 to obtain network activity information corresponding to the user's computing device 110. For example, the data processing system 120 can prompt the user of the computing device 110 for consent to obtain one or more types of network activity information. The identity of the user of the computing device 110 can remain anonymous and the computing device 110 may be associated with a unique identifier (e.g., a unique identifier for the user or the computing device provided by the data processing system or a user of the computing device). The data processing system can associate each observation with a corresponding unique identifier.

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether or how to receive content from the content server that may be more relevant to the user. In addition, certain data may be treated in one or more ways before it is stored or used, so that certain information about the user is removed when generating parameters (e.g., demographic parameters). For example, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information is collected about the user and used by a content server.

The data processing system 120 may include a location engine 130. The location engine 130 can be designed and constructed to receive, identify or determine location information of a computing device 110. The data processing system 120 can receive, identify, or determine the location information based on, responsive to, or using a request for a content item object or a data ping. The location information of a computing device can include, for example, a geographic location of the computing device, a location term or information input into an input text box in a graphical user interface, historical location information, or travel mode (e.g., walking, driving, biking, flying, or train). In some cases, the location information can be a location search query input into a text box of a map application user interface rendered by the computing device 110 for display on a display device of the computing device 110. The location information can correspond to a location of the computing device, or a location different from or unrelated to the location of the computing device. For example, the computing device 110 can be location in San Jose, and a user of the computing device 110 can input a location search query of "Miami, Florida" into a map application to request a map of Miami, Florida.

In some cases, the data processing system 120 can determine a current location, a previous location or a historic location of the computing device 110. To determine the location of the computing device 110, the location engine 130 can receive geo-location data points associated with the computing device 110 to determine the location information. The data processing system 120 can receive the data points via a computer network 105 via a TCP/IP protocol, cell phone data network, or another communication protocol of computer network 105. The data points can include location information, time information, or the data processing system 120 can determine the location or time information associated with a received data point upon receiving the data point from the computing device 110. The data processing system 120 can also receive an identifier associated with the data point, such as a unique account identifier, computing device identifier, or a username associated with an application executing on the computing device 110. In one implementation, an application executing on the computing device 110 (e.g., a mobile application, a mobile operating system, a web browser, a map application, etc.) can transmit the geo-location data point that includes the location information. In one implementation, a mobile computing device 110 may periodically ping the data processing system 120 or other intermediate system to provide location or time information. In one implementation, a smartphone or other cellular enabled computing device 110 can ping a cell phone tower system, which may then provide location or time information to the data processing system 120.

The data processing system 120 can receive geo-location data points or pings in real time, or a predetermined time interval such as a periodic basis (e.g., 10 minutes, 5 minutes, 1 minute, 30 seconds, or another period that can facilitate the systems and methods disclosed herein). The data processing system 120 can receive the data points in a batch process that runs periodically where multiple geo-location data points associated with a computing device 110 or multiple user devices 110 can be provided to the data processing system 120 in a single upload process. The computing device 110 can push the data points to the data processing system 120 in real-time, on a periodic basis, or in a batch process.

The data points can include, or the data processing system 120 may determine, geographic location information of the geo-location data point based on, e.g., GPS, Wi-Fi, IP address, Bluetooth or cell tower triangulation techniques. The data processing system 120 can determine a latitude and longitude coordinate and identify a larger geographic area or cell comprising the latitude and longitude coordinate. The geographic location can correspond to a latitude or longitude coordinate, or the geographic location may correspond to a larger or smaller area, for example.

The received data points can include, or the data processing 120 can determine, geographic location information including, e.g., latitude and longitude coordinates, geographic information system ("GIS") information, country, state, city, county, town, or precinct. The data processing system 120 may receive or otherwise identify geographic location information associated with the computing device 110 via an application programming interface ("API") that can provide scripted access to geographic location information associated with the computing device 110. For example, the geographic API specification may include a specification associated with the World Wide Web Consortium ("W3C"). In one implementation, a user of a computing device 110 proactively declares a location by checking-in to a location or otherwise declaring to an application executing on the computing device 110 or to the data processing system that the user is at a location.

In some implementations, the geographic location of the computing device 110 can be determined via at least one of a global positioning system ("GPS"), cell tower triangulation, or Wi-Fi hotspots. In some implementation, the data processing system 120 can identify or determine the technique used to determine a geographic location in order to determine an accuracy of the determined geo-location data point (e.g., GPS-based location information may be more accurate than IP-based location information). The data processing system 120 can also determine geographic location information based on a user's interaction with an information resource. In some implementations, the computing device 110 may include a global positioning system ("GPS"). In some implementations the data processing system 120 may determine a geographic location based on an internet protocol ("IP") address. For example, the computing device 110 may include a GPS sensor or antenna and be configured to determine a GPS location of the computing device 110. The data processing system 120 can also determine the geographic location by using information obtained from one or more cell towers to triangulate the location of the computing device 110. For example, the geographic location determined based on one information received from one cell tower, two cell towers or three cell towers may be sufficient for content selection. In some implementations, Wi-Fi hotpots may facilitate determining a geographic location because Wi-Fi hotspots may be stationary and can be used as a landmark. For example, the relation of a computing device 110 with respect to a Wi-Fi hotspot can facilitate determining a geographic location of the computing device 110.

The data processing system 120 (e.g., via the location engine 130) can provide graphical content for display on the computing device 110. The data processing system 120 can provide data or data packets corresponding to the graphical content to establish the graphical environment on the computing device. Establishing the graphical environment on the computing device can include, for example, establish a view area for the graphical content, an extent, an active area, zoom level, pan amount, scale, filters, or content slot in which content item objects can be inserted. For example, the data processing system 120 can provide, for display via the computing device, a bitmap representing a map corresponding to the location information. The data processing system 120 can provide overlays on the map, replace content on the map, or otherwise manipulate the graphical environment or graphical content displayed on the computing device 110.

The data processing system 120 (e.g., via location engine 130) can determine or identify a boundary, extent, threshold, or an indication of a viewable area of the graphical environment or active area of the graphical environment. The boundary can base based on a predetermined threshold, distance, pixels, resolution, screen size, zoom level, profile information, travel mode, location information, or travel mode. For example, the boundary can be a predetermined distance such as 0.5 mile, 0.75 miles, 1 mile, 2 miles, 5 miles, 10 miles, 30 miles, or other distance that facilitates minimizing latency in content selection for a graphical environment by reducing a set of available content items based on a geographic boundary. The data processing system 120 can identify a location and then set the boundary as a radius corresponding to the predetermined distance around the location. For example, if the location search query is "San Jose, California", the boundary can be a 5 mile radius around San Jose. The boundary can be other shapes, such as a square, rectangle, oval, ellipse, or other polygon formed around, or including, the location.

In some cases, the boundary can be determined or formed based on the location information and a zoom level. The zoom level can refer to a value that indicates or represents the magnification of graphic content. A user of the computing device 110 can manipulate or adjust the zoom level using a zoom element 230 shown in FIG. 2. The zoom element 230 can include a zoom in button 230 and a zoom out button 240. The zoom element 230 can include a zoom level indicator 245 that indicates the amount of magnification. The data processing system 120, location engine, or computing device can adjust the magnification of the graphical content responsive to receiving an indication to zoom in or zoom out via zoom element 230.

The data processing system 120 can determine a zoom level using a query or function. For example, the data processing system 120 can be configured with a getZoom( ) technique. The getZoom( ) function can return a current zoom level of the graphical content or map. The zoom level can include a value, numerical value, letter, symbol, color, or other indicator of zoom level.

In some cases, the data processing system 120 can determine, based on the zoom, the boundary or extent of the graphic content or map. The data processing system 120 can define or establish the boundary as geographic coordinates, map tiles, a geographic area, or a location point and a radius. The data processing system 120 can determine store the boundary as a data structure that includes the coordinates, map tile information, geographic area (e.g., city, town, state, county), or location point and radius. For example, the boundary can include {latitude, longitude, radius}. In another example, the boundary can correspond to a polygon defined by geographic coordinates as follows: a four-sided polygon as {coordinate 1, coordinate 2, coordinate 3, coordinate 4}; a 6 sided polygon as {coordinate 1, coordinate 2, coordinate 3, coordinate 4}. The coordinate can include latitude and longitude coordinates. The data processing system 120 (e.g., location engine 130) can pass, provide, transmit, input or otherwise communicate the boundary to a content selector.

The data processing system 120 can include a content selector 135. The content selector 135 can be designed and constructed to identify or select one or more content item objects for display in a non-textual graphical environment. A non-textual environment refers to a graphical environment where the main content of the environment is an image such as a map. Whereas, a textual environment can refer to an information resource such as an article, news article, editorial, essay, blog, social network post, electronic mail, or other online document that includes text, words, keywords, or phrases. For example, to select content items for display in a textual environment, the data processing system can parse the text to identify keywords, and use the keywords to select a matching content item based on a broad match, exact match, or phrase match. For example, the content selector 135 can analyze, parse, or otherwise process subject matter of candidate content items to determine whether the subject matter of the candidate content items correspond to the subject matter of the textual information resource. The content selector 135 may identify, analyze, or recognize terms, characters, text, symbols, or images of the candidate content items using an image processing technique, character recognition technique, or database lookup. The candidate content items may include metadata indicative of the subject matter of the candidate content items, in which case the content selector 135 may process the metadata to determine whether the subject matter of the candidate content item corresponds to the web page or search query.

Content providers may provide additional indicators when setting up a content campaign that includes content items. The content provider may provide information at the content campaign or content group level that the content selector 135 may identify by performing a lookup using information about the candidate content item. For example, the candidate content item may include a unique identifier, which may map to a content group, content campaign, or content provider. The content selector 130 may determine, based on information stored in content campaign data structure in data repository 155, information about the content provider 125.

However, in a non-textual graphic environment, the graphic content may not include relevant keywords, terms or phrases that can be used to select content item objects. For example, a map of a geographic area such as San Jose, California can have different types of unrelated points of interests, such as restaurants, coffee shops, retail stores, museums, parks, gardens, educational institutions. Thus, it may be challenging for the data processing system to select content items responsive to a location search query, such as "San Jose, California", that does not include subject matter keywords such as pizza, Italian, jewelry, shoes, jeans, etc. It may be challenging because the data processing system could identify a large amount of unrelated, different points of interest that correspond to the geographical area including San Jose, California. Analyzing and processing the large amount of information in the geographic area can introduce lag, delays, or latency in selecting a content item object for presentation in the graphical environment.

Thus, to facilitate reducing, minimizing, preventing, or eliminating latencies in content selection, the data processing system 120 (e.g., via content selector 135) can determine or identify content items that each having an entry in a location field that satisfies a boundary formed from the location information. For example, a content provider 125 can establish a content campaign with one or more content items or content groups. A content campaign can refer to one or more content groups that are associated with a theme. A content group can refer to one or more content items or content item objects (e.g., a textual content item, image content item, advertisement, online document) that correspond to a landing webpage. Content items in a content group can share the same or similar content selection criteria (e.g., keywords, entities, geographic criteria, or device type).

Data about the content campaign, content group, or content item can be stored in the content campaign data structure 160. The data structure can include one or more fields including, for example, fields for an identifier of a content provider, an identifier of a content campaign, an identifier of a content group, an identifier of a content item, a filename or pointer to an image or data file of the content item, content selection criteria such as keywords, or a geographic location associated with the content item or content provider. Table 1 illustrates an example content campaign data structure.

TABLE 1

Illustration of an example content campaign data structure in accordance with an implementation.

| Content Provider | Content Item ID | Content Selection Criteria (kw) | Geographic Location | Landing Page |
|---|---|---|---|---|
| Company_A | A1 | Pizza | San Jose, California | www_companyA_com |
| Company_A | A2 | Calzone | San Jose, California | www_companyA_com |

TABLE 1-continued

Illustration of an example content campaign data structure in accordance with an implementation.

| Content Provider | Content Item ID | Content Selection Criteria (kw) | Geographic Location | Landing Page |
|---|---|---|---|---|
| Company_A | A3 | subs | San Jose, California | www_companyA_com |
| Company_B | B1 | Museum | San Jose, California | www_companyB_com |
| Company_C | C1 | Amusement park | Anaheim, California | www_companyC_com |
| Company_D | D1 | Hotel | San Jose, California | www_companyD_com |
| Company_E | E1 | Auto repair | San Jose, California | www_companyE_com |

As illustrated in the example content campaign data structure shown in table 1, content providers can establish a content campaign with one or more fields or data that facilitates content selection by the data processing system 120. To minimize latency in selecting content, the data processing system 120 (e.g., via location engine 130) can determine a boundary or extent. The data processing system can compare the location in the content campaign data structure to determine whether the location is within the boundary determined by the location engine 130. The data processing system 120 can filter out content items based on the comparison.

In the example illustrated in Table 1, the data processing system 120 can determine that the boundary corresponds to a city or town such as San Jose, California. The data processing system 120 can then filter out content items that are not in the determined boundary. In this case, the data processing system 120 can identify content items A1, A2, B1, and C1. The data processing system 120 can determine that A1, A2 and B1 correspond to San Jose, but C1 corresponds to Anaheim, which is outside the determined boundary. Thus, the data processing system 120 can establish a subset of content items as {A1, A2, B1} based on the boundary. The data processing system can use the established subset of content items for further processing.

Using the filtered subset, the data processing system 120 can select a second subset of content items based on category information. For example, the data processing system 120 can selecting a second subset of content items that are assigned to a first category of one or more categories based on a load balancing technique, such as a smoothing function. The load balancing technique can include a smoothing technique or function or policy configured to improve resource allocation. The load balancing technique can facilitate reducing wasted resources or inefficient resource allocation, or optimizing resource use.

The data processing system 120 can be configured with a load balancing technique that establishes categories based on campaign parameters such as campaign duration, budget, or resource availability. For example, the data processing system 120 can establish a category based on the amount of duration left in a content campaign and the amount of budget remaining in the content campaign. The category can be based on a ratio of the duration and budget. The duration can include a time interval remaining, a percent of duration remaining, or a number of days, hours, minutes or seconds remaining in the content campaign. The time remaining can refer to the start and end of a content campaign as established by the content provider that set up the content campaign. For example, a content campaign can have a duration of 1 week, 2 weeks, 30 days, 1 month, 60 days, 90 days, 180 days or some other time interval or duration. The duration can be defined as {begin_date_time, end_date_time}. The duration can be stored in the campaign data structure. The data processing system 120 can determine a duration remaining by monitoring a current time and determining the difference between the current time and the end date_date_time, and dividing the difference by the duration as determined by the difference between the end_date_time and the begin_date_time. For example, if the 7 days, and 4 days have been completed, then there are 3 days left, or approximately 43% duration remaining.

The budget for the content campaign can be established by the content provider. The budget can refer to the amount of resources or monetary amount the content provider has allocated for the content campaign. The budget can be in a currency (e.g., United States dollars or other currency), points, tokens, or other unit that indicates an amount of a resource. The budget can stored in the content campaign data structure.

Table 2 illustrates a content campaign data structure including budget and duration fields.

TABLE 2

Example illustration of a content campaign data structure

| Content Provider | Content Item ID | Geographic Location | Resource/ Budget (USD) | Duration |
|---|---|---|---|---|
| Company_A | A1 | San Jose, California | 100 | 7 days |
| Company_A | A2 | San Jose, California | 100 | 7 days |
| Company_A | A3 | San Jose, California | 100 | 7 days |
| Company_B | B1 | San Jose, California | 100 | 7 days |
| Company_C | C1 | Anaheim, California | 100 | 7 days |
| Company_D | D1 | San Jose, California | 50 | 7 days |
| Company_E | E1 | San Jose, California | 50 | 7 days |

To determine the duration and resource availability, the data processing system 120 (e.g., content selector 135) can determine the amount of resources consumed for each content campaign and the duration remaining for each content campaign. The data processing system 120 can determine the amount of resources consumed for a content campaign using one or more techniques that monitor the resource allocation or consumption of the content campaign. For example, the data processing system 120 can be configured with a metering module that monitors resource consumption. In some cases, the data processing system 120 can meter performance metrics of the content campaign, and compute or determine the resource consumption based on the performance metric. For example, the data processing system 120 can store impression records that indicate a number of selections of a content campaign and a number of conversions.

The impression record data structure 165 can be stored in data repository 155. The impression record data structure 165 can include a table format or other data format for storing, maintaining, organizing or manipulating impression records. An impression record may refer to an instance of displaying a content item on a web page. The impression may include information about the web page on which the content item is displayed (e.g., uniform resource locator of the web page, location/position of the content slot, keywords of the web page), search query input by the user into a search engine that resulted in the content item being selected, a keyword of the content item and/or a keyword of the web page or search query that resulted in the content item being selected for display (e.g., via a broad, phrase or exact match or other relevancy or similarity metric), time stamp associated with the impression, geographic location of the computing device 110 on which the content item is displayed, or type of device.

The data processing system 120 may store content item impression records in the data repository 155 on a temporary basis and remove or delete the impression records after some duration (e.g., 24 hours, 48 hours, 72 hours, 30 days, 60 days, 90 days, etc.). The data processing system 120 may remove the impression records responsive to an event, condition or trigger. For example, the data processing system 120 may delete the impression record responsive to a request to delete impression history information, or after a time interval or duration after termination of the call associated with the impression.

The data processing system 120 can determine, based on the number of conversion or selections, the budget spent on the conversions or selection. In another example, the data processing system 102 can determine the amount of budget spent based on a winning bid amount. For example, the content selector 135 can initiate an online auction to select content items, where content providers associate bids with content items. The content item associated with the highest ranked bid can be selected for display on an information resource. This highest ranked bid amount can correspond to the resource and deducted from a resource account of the content provider.

Thus, the data processing system 120 can determine, for a content campaign, at a given time, a ratio based on an amount of budget remaining and the remaining duration. The data processing system 120 can establish categories based on the ratio of the budget remaining and remaining duration as follows: budget remaining divided by ("/") duration remaining; budget remaining (%)/duration remaining (# of days); budget remaining (%)/duration remaining (# of minutes); or budget remaining (%)/duration remaining (%). Table 3 illustrates an example data structure storing the budget remaining, duration remaining, and the ratio for each content item that satisfies the boundary of San Jose, California.

TABLE 3

Illustration of example data structure storing budget remaining, duration remaining, and a ratio of budget remaining to duration remaining for each content item

| Content Provider | Content Item ID | Geographic Location | Budget Remaining % | Duration Remaining | Budget/ Duration |
|---|---|---|---|---|---|
| Company_A | A1 | San Jose, California | 80 | 1 day | 80% |
| Company_A | A2 | San Jose, California | 80 | 1 day | 80% |
| Company_A | A3 | San Jose, California | 80 | 1 day | 80% |
| Company_B | B1 | San Jose, California | 80 | 2 days | 40% |
| Company_D | D1 | San Jose, California | 100 | 4 days | 25% |
| Company_E | E1 | San Jose, California | 50 | 5 days | 10% |

Using the determined ratio, the data processing system 120 can categorize content items. Categories can include, for example, 80% or above; 60 to 79%; 40 to 59%; 20 to 39%; 0 to 19%. Table 4 illustrates a data structure that assigns or allocates content items based on categories.

TABLE 4

Illustration of a data structure allocating content items to categories

| Category # | budget remaining (%)/duration remaining (# of days) | Content Items |
|---|---|---|
| 1 | 100-80 | A1, A2, A3 |
| 2 | 79-60 | none |
| 3 | 59-40 | B1 |
| 4 | 39-20 | D1 |
| 5 | 19-0 | E1 |

The data processing system 120 can input the duration and the resource availability into the load balancing technique (e.g., smoothing function) to categorize the content items into categories, as shown in Table 4. The output of the load balancing technique can include a value such as the ratio of the budget remaining to duration remaining column illustrated in Table 3. This output can be used to categorize the content items as shown in Table 4, where a first category ranks higher than the second category, the second category ranks higher than the third category, the fourth category ranks higher than the fifth category. In some implementations, the data processing system 120 can use more or less than five categories, and different category limits or bounds.

In some cases, the data processing system 120 can further assign a priority value to each content item. The data processing system 120 can access an impression record data structure 165 for the set of content items to retrieve, from a view field, a priority value for each of the first plurality of content items. The priority value can indicate whether the content item has been previously provided for presentation on or via a computing device. For example, a higher priority value can correspond to the content item not being previously provided for display, whereas a lower priority value indicates that the content item has already been provided for presentation to the computing device.

The data processing system 120 can assign the priority value based on whether the content item has been displayed or a number of times the content item has been displayed on a particular device, to a user, or across any computing devices. The data processing system 120 can assign the priority value based on whether the content item has been displayed or a number of times the content item has been displayed on a particular device, to a user, or across any computing devices during a time interval. For example, the data processing system 120 can assign a priority value of 1 to content item A1 if it has not been displayed to computing device 110 during the duration of the content campaign corresponding to content item A1. The data processing system 120 can assign a priority value of 2 (which may be ranked lower than 1) to content item A2. The data processing system 120 can select content items that have a higher priority instead of content items that have a lower priority such that content items that have not been previously presented on a computing device are presented before content items that have already been presented.

The data processing system 120 can determine a second subset of content items from the first subset of content items (e.g., those content items included in Table 4) based on a combination of the priority value. The data processing system 120 can select the second subset based on the highest category and priority pairing. For example, category 1 can be the highest ranked category based on the load balancing technique. Category 1 can include three content items A1, A2 and A3. Within category 1, content items A1 and A2 can have a high priority because they have not been previously presented, and content item A2 can have a low priority because it has been previously presented on the computing device.

To select the content item to provide for display, the data processing system 120 can retrieve, from a data structure stored in memory, values (or features or scores) corresponding to the subset of content items. The values can be generated by the data processing system 120 using an offline process. The values can a likelihood of interaction with the content item, such as a predicted click through rate or a predicted conversion rate.

The data processing system 120 (e.g., via content selector 135) can input the values, features or scores for the content items into a classifier 140 to select the content item from the highest group/priority pairing. In some cases, latency can be minimized by only processing the content items corresponding to the second subset, which can include content items A1 and A2. To further minimize latency in the process of providing content item objects in real-time for display on a graphical environment, the data processing system 120 can precompute some of the features or values in an offline process. The precomputed values of features can be stored in value data structure 170. The data processing system can input a combination of predetermined features or values and real-time features or values into the classifier 140 responsive to a request for the content item that lacks a keyword. Example values or features can include:

- Determine values based on historical terms input by a plurality of different computing devices for the location. For example, the data processing system can identify search terms that are searched for near a location. For example, if the data processing system historically receives a number or frequency of search queries for Gardens near San Jose, then when the data processing system receives a search query for just "San Jose", the data processing system can increase the likelihood that content items for Garden shops are selected.
- Increase likelihood of selection for content items corresponding to the suburb/area around the location, and if the search area is too specific (e.g. a residential address) then distance to the search area can be used in the ranking content items.
- Increase likelihood of selection of content items corresponding to popular stores based on foot traffic.
- Number of times the computing device has presented the content item object (lower is better)
- Number of computing device that have presented the content item (lower is better)
- Determine value based on a number of HTML requests to access a resource corresponding to each of the second plurality of content items. For example, a number of HTML requests to access an information resource or website of the campaign in the last 30 days (higher is better)
- Number of visits to a store owned by the campaign owner or content provider in the last 30 days (higher is better)
- Is a user interested in the category of the campaign (e.g. boats) (yes is better)
- When did the user last research the category of the campaign (e.g. boats) (sooner is better)
- Determining a value based on a Doppler radar forecast for the location. For example, are the environmental conditions (Time of day, weather, etc.) suited to the campaign (more matches are better)
- Click through rate on previous showings The classifier 140 can be configured with or include a machine learning technique or engine. For example, the classifier 140 can be configured with a Naive Bayes classifier which can refer to a probabilistic classifier based on applying Bayes' theorem with strong (naive) independence assumptions between the features. The classifier 140 can construct or maintain a model that assigns class labels to problem instances, represented as vectors of feature values, where the class labels are drawn from some finite set. The classifier can use a family of techniques based on a common principle; e.g., naive Bayes classifiers can assume that the value of a particular feature is independent of the value of any other feature, given the class variable. For example, a user may be interested in purchasing sun screen if the weather is sunny, the temperature is 80 degrees, the location boundary includes a beach, the time of day is between 9 AM and 12 PM, and the day is a Saturday. A naive Bayes classifier considers each of these features to contribute independently to the probability that a user may be interested in a content item, regardless of any possible correlations between the color, roundness and diameter features. In some cases, the classifier can be trained in a supervised learning setting. For example, parameter estimation for naive Bayes models can use the method of maximum likelihood.

The data processing system 120 can select, responsive to a content request lacking a keyword (or having no keywords or having no keywords in addition to geographic location information such as an address or latitude and longitude coordinate), a content item object from the subset of content items based on the output of the classifier using the plurality of values. A content request can lack a keyword if the content request only includes or is associated with location information, such as geographic location information. The content request can have no additional keywords such as topical keywords, vertical, or concepts. The content request can have no non-geographic location information. To select the content item object, the data processing system 120 can input content items A1 and A2 into the classifier, and the output may indicated that a likelihood of interaction with content item A1 is higher than content item A2. The data processing system 120 can then select content item A1 for presentation to the computing device.

In some cases, the data processing system 120 can only input values determined offline into the classifier 140 to select a content item. In some cases, the data processing system can use a combination of offline and real-time values to select the content item. For example, the data processing system 120 can determine the current weather or time of day as a real-time value, mode of transportation of the computing device, or profile information associated with the computing device.

In some cases, the data processing system 120 can use resource utilization or availability information. For example, the data processing system 120 can obtain, from a resource monitor 180 executed by the computing device 120, information about available bandwidth, network connectivity, processor utilization, memory utilization, etc. The data processing system 120 can compare a utilization metric with a threshold to determine whether to select a content item object. For example, if there is low bandwidth, the data processing system 120 may determine to display a content item object that has a smaller data file size. For example, the data processing system 120 may provide a content item object that is a text content item object, as opposed to an image content item object, video content item objector multimedia content item object. By selecting the text content item object, the data processing system 120 can minimize latency in the graphic environment by providing a content item that consumes less resources, thereby prioritizing resource use by the graphic environment or map application to take priority of resources.

The data processing system 120 can use a combination of a real-time values and offline values to select a content item based on information from the resource monitor 180. The data processing system can identify a bandwidth availability for the computing device 110. The data processing system can generate a value or score using an online process based on whether the bandwidth satisfies a threshold (e.g., 0.5 Mbps, 1 Mbps, 2 Mbps, 5 Mbps, or 10 Mbps). For example, a higher score can indicate a satisfactory bandwidth, and a low score can indicate an unsatisfactory bandwidth. The score can be based on a data file size of the content item object. For example, the score for A1 can be high if the data file size for A1 is low and the bandwidth does not satisfy the threshold. The score for A2 can be low if the data file size is high and the bandwidth does not satisfy the threshold. In another example, the score can be high if the file size is high, but the bandwidth satisfies the threshold, indicating that latency may not be introduced by a high file size because there is sufficient bandwidth. The score can indicate a likelihood of interaction because minimizing latency improves the user interface and user experience, thereby increasing the likelihood of interaction.

Responsive to the search query or other request for content lacking a keyword (or having no non-geographic location information such as topics, concepts, adjectives, or having only geographic location information such as an address, zip code, latitude and longitude coordinates), the data processing system 120 (e.g., via content selector 130) can identify, select or otherwise obtain content to be provided or presented via the computing device 110 making the request, or some other computing device 110 associated with the request for content. In some implementations, the data processing system 120 may identify, select, or otherwise obtain content not responsive to receiving any request. The content may include, e.g., text, characters, symbols, images, video, audio, or multimedia content. The content may include a phone number, a virtual phone number, or a call extension. The content item may include a link provided by content providers and included by data processing system (e.g., via content selector) for display with the search results page. The content item may include a link or button to a phone number that facilitates providing reporting data to a content provider. In cases where the content item includes a virtual phone number or a call extension, the content item may be referred to as a call content item. The request for content can include a request for an online advertisement, article, promotion, coupon, or product description. The data processing system 120 can receive the request from a computing device such as, e.g., computing device 110. For example, the data processing system 120 can receive the request via an application executing on the computing device 110, such as a mobile application executing on a mobile device (e.g., smart phone or tablet). In some cases, the data processing system 120 may not receive a separate request for content and, instead, select and provide the content responsive to the location search query lacking keywords (or having no keywords such as non-geographic location information such as an address, zip code, city, town, or latitude/longitude coordinates). In some instances, an information resource may request content from the data processing system 120 responsive to a user of a mobile device 110 visiting the information resource (e.g., via a mobile device 110).

The request for content can include information that facilitates content selection. The data processing system 120 may request or obtain information responsive to receiving a request for content from the computing device 110. The information may include information about displaying the content on the computing device 110 (e.g., a content slot size or position) or available resources of computing device 110 to display or otherwise manipulate the content.

The data processing system 120 may identify multiple content items (e.g., a first candidate content item and a second candidate content item) that are responsive to the request for content, or are otherwise candidates for display in the graphic environment. The data processing system may initiate or utilize an online auction process to select one or more of the multiple content items for display on the online document. An auction system may determine two or more bids for content items to be displayed in an online document. The auction system can run the bids through an auction process to determine one or more highest ranking bids or winning bids. Content items corresponding to the highest ranking or winning bids may be selected for display on or with the online document.

The data processing system can provide, via a network, the selected content item object to the computing device to cause the computing device to render the content item object on an electronic map in the graphical environment. In some case, the data processing system 120 or computing 110 can convert a portion of the electronic map into structured content configured to display the content item object. For example, the computing device 110 can execute an application 185 such as a web browser or a mapping application. The data processing system 120 can provide the content item object to the computing device to cause the application 185 to render the content item object in the graphic environment.

Figure 2:
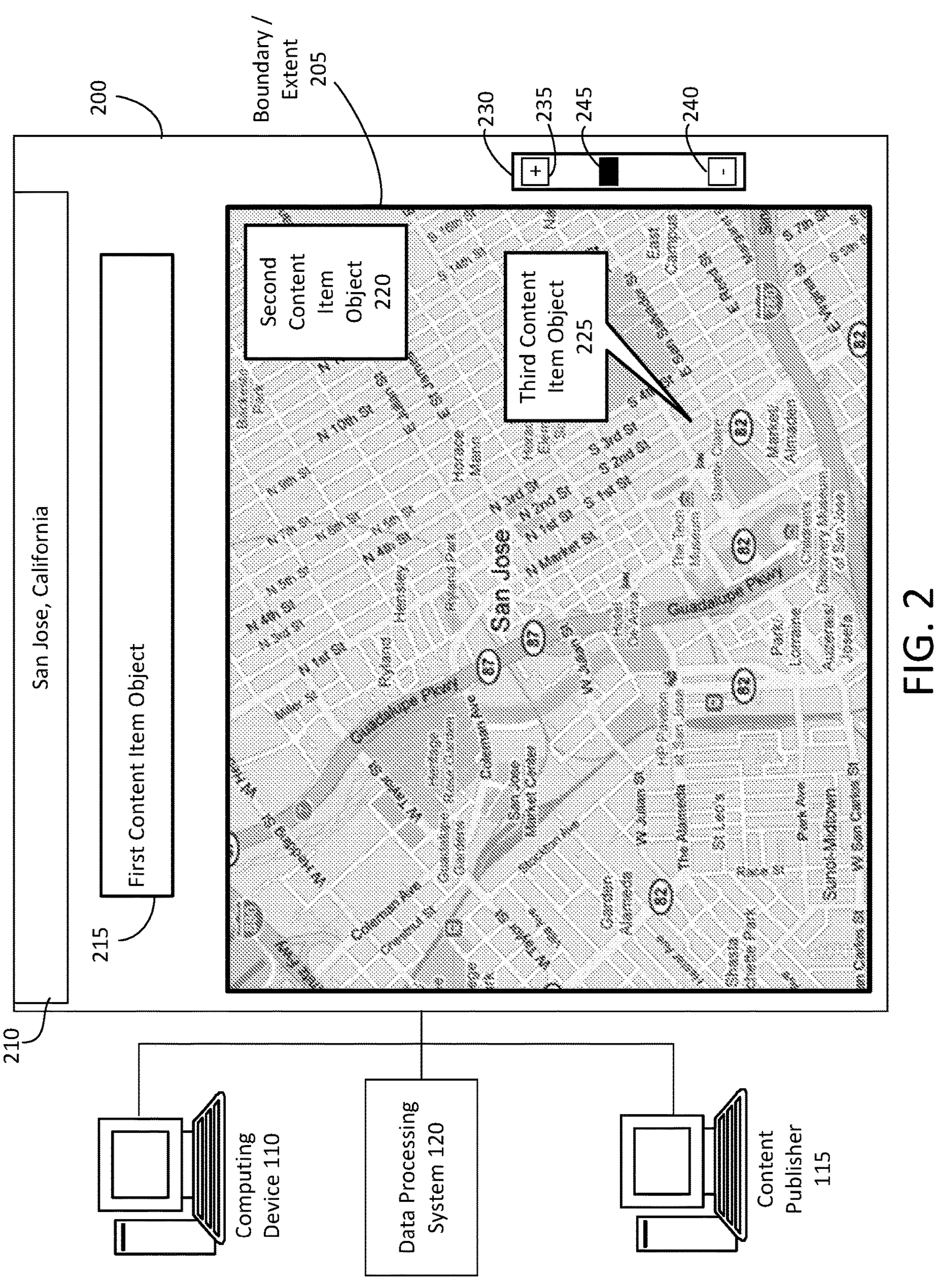
FIG. 2 is an illustration of a non-textual graphical environment with content item objects selected and delivered by a data processing system in accordance with an implementation.

FIG. 2 is an illustration of a non-textual graphical environment with content item objects selected and delivered by a data processing system in accordance with an implementation. The computing device 110 can execute an application 185 that provides the graphic environment 200. The graphical environment 200 can include or display non-textual graphic content such as a map. A map can also be referenced to unstructured content because it is not a structured data set such as article that includes keywords related to a topic or concept. The environment 200 can include an input text box 210 for a location search query. The location search query can include only location terms without additional keywords. For example, a location term can be a city, town, state without additional keywords, such as "San Jose, California". The graphic environment can include one or more content slots 215, 220 and 225. The content item slots 220 and 225 can be overlaid on the graphic content within the boundary region 205. The content item slot 215 can be outside the graphic content boundary region 205. In some cases, the application 185 can convert a portion of the electronic map (e.g., slot 225 or 220) into structured content configured to display the content item object. The electronic map can include, e.g., one or more of a street view, satellite view, map view, hybrid view, or augmented reality view.

The environment 200 can include a zoom element 230. In some cases, the data processing system can receive an indication to zoom the electronic map. The data processing system can remove, responsive to the indication, one or more content items that are not viewable. For example, the map may have initially included Anaheim, California and content item objects for Anaheim, but responsive the user zooming into California, the data processing system 120 removes the content item objects outside the boundary 205.

The data processing system 120 can receive the location search query 210 lacking keywords and select one or more content item objects for presentation via content items slots 215, 220 and 225. In some cases, the content item object can indicate a location of the content item object, as shown by content item object 225 pointing to a location on the map.

Figure 3:
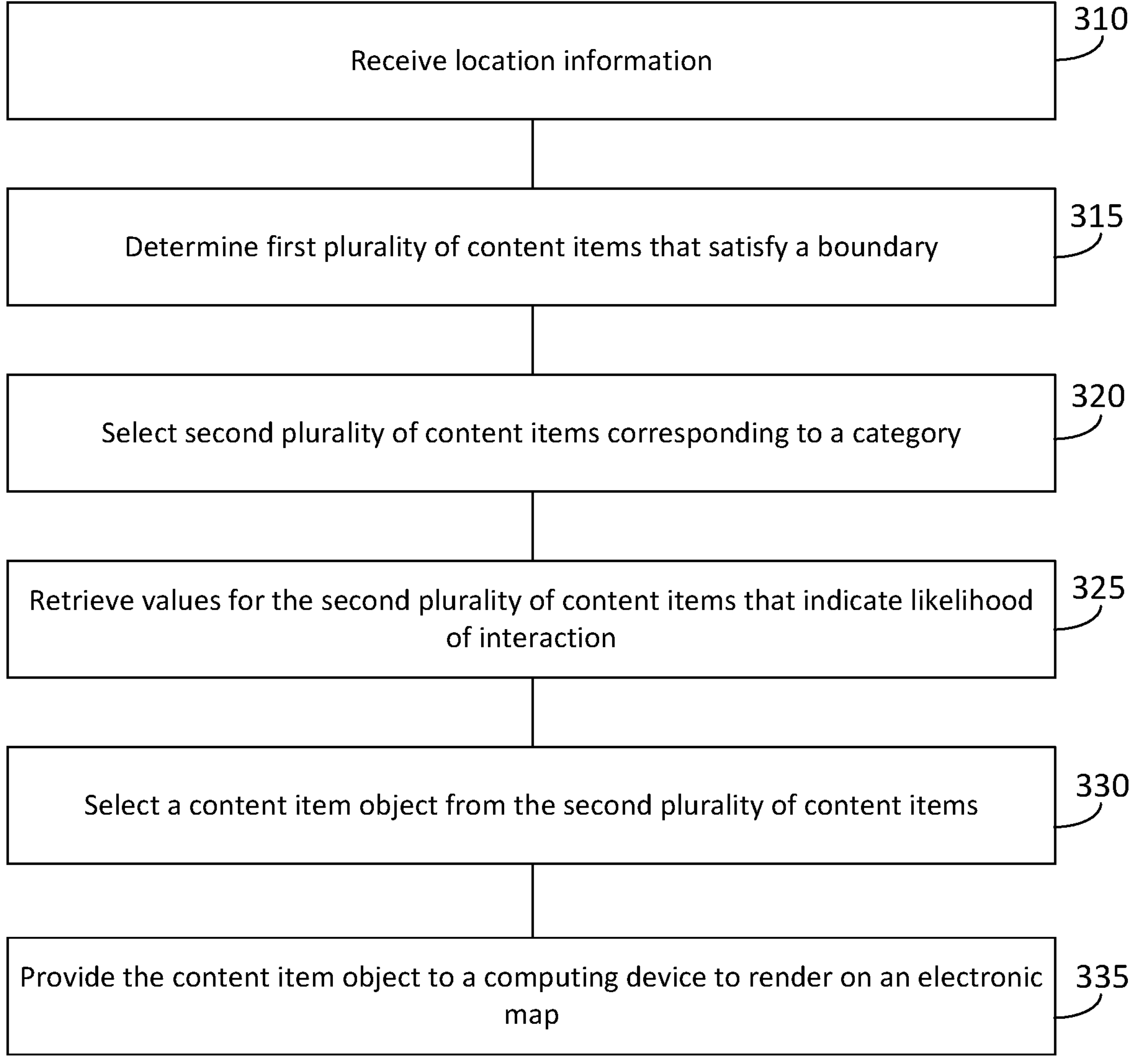
FIG. 3 is an illustration of a method of reducing latency in a graphical environment in accordance with an implementation.

FIG. 3 is an illustration of a method of reducing latency in a graphical environment provided via information technology infrastructure in accordance with an implementation. The method 300 can be performed via one or more system, component or interface illustrated in FIG. 1, FIG. 2, or FIG. 5, including, e.g., a data processing system, location engine, content selector, classifier, resource monitor, mapping engine, or data repository. In brief overview, and in some implementations, the method 300 includes a data processing system receiving location information at act 310. At act 315, the data processing system determines a first plurality of content items that satisfy a boundary. At act 320, the data processing system selects a second plurality of content items corresponding to a category. At act 325, the data processing system retrieves values for the second plurality of content items that indicate a likelihood of interaction. At act 330, the data processing system selects a content item object from the second plurality of content items. At act 335, the data processing system provides the content item object to a computing device to render on an electronic map.

Still referring to FIG. 3, and in further detail, a data processing system receiving location information at act 310. The data processing system can receive location information from a computing device via a network. The data processing system can receive location information input into an application executed by a computing device. For example, a user can input a location search query into the application executed by the computing device that includes a city and state, zip code, or county. The application can transmit the location to the data processing system. In some cases, the data processing system can determine the location information using location sensor information. For example, the computing device can include a location sensor such as GPS module. The data processing system can receive the GPS information and determine location information.

At act 315, the data processing system determines a first plurality of content items that satisfy a boundary. The data processing system can use the location information to generate, define or otherwise identify a boundary. The boundary can be based on a zoom level of an image or graphical content displayed or presented on the computing device. The boundary can be based on the viewable display size of the computing device or resolution of the computing device. The boundary can refer to the viewable graphic content on the computing device. For example, in a map application, the boundary can refer to the viewable geographic area displayed or presented on the computing device. The data processing system, using the boundary, can identify content items that correspond to a location within the boundary. For example, each content item can include a location (e.g., an address of a restaurant or retail shop; flight tickets to a geographic destination; or location keywords for a product such as sun screen or bathing suits). The data processing system can remove content items that do not correspond to a location within the boundary to create a first subset of content items having a location within the boundary.

At act 320, the data processing system selects a second subset of content items corresponding to a category. The data processing system can use a load balancing technique to identify content items that have a high amount of budget remaining and a low duration remaining in order to facilitate using the entire budget for the content item. For example, a content provider may desire to spend their entire established budget for the content campaign. Thus, based on the ratio of the remaining budget and remaining duration, the data processing system can prioritize selecting the content item using different categories. The categories can be based on the ratio of budget remaining and duration remaining. In some cases, the data processing system can further prioritize content items within the category based on whether the content item has been previously presented.

At act 325, the data processing system retrieves values for the second subset of content items that indicate a likelihood of interaction. The values can be precomputed using an offline classifier. The values can be based on features and indicate a likelihood of interaction. By using offline values, the data processing system can minimize latency. At act 330, the data processing system can select a content item object from the second subset of content items. The data processing system can select the content item using an online auction process that determines a score based on the offline scores, real-time scores, or bid amounts associated with the content items. At act 335, the data processing system provides the content item object to a computing device to render on an electronic map.

Figure 4:
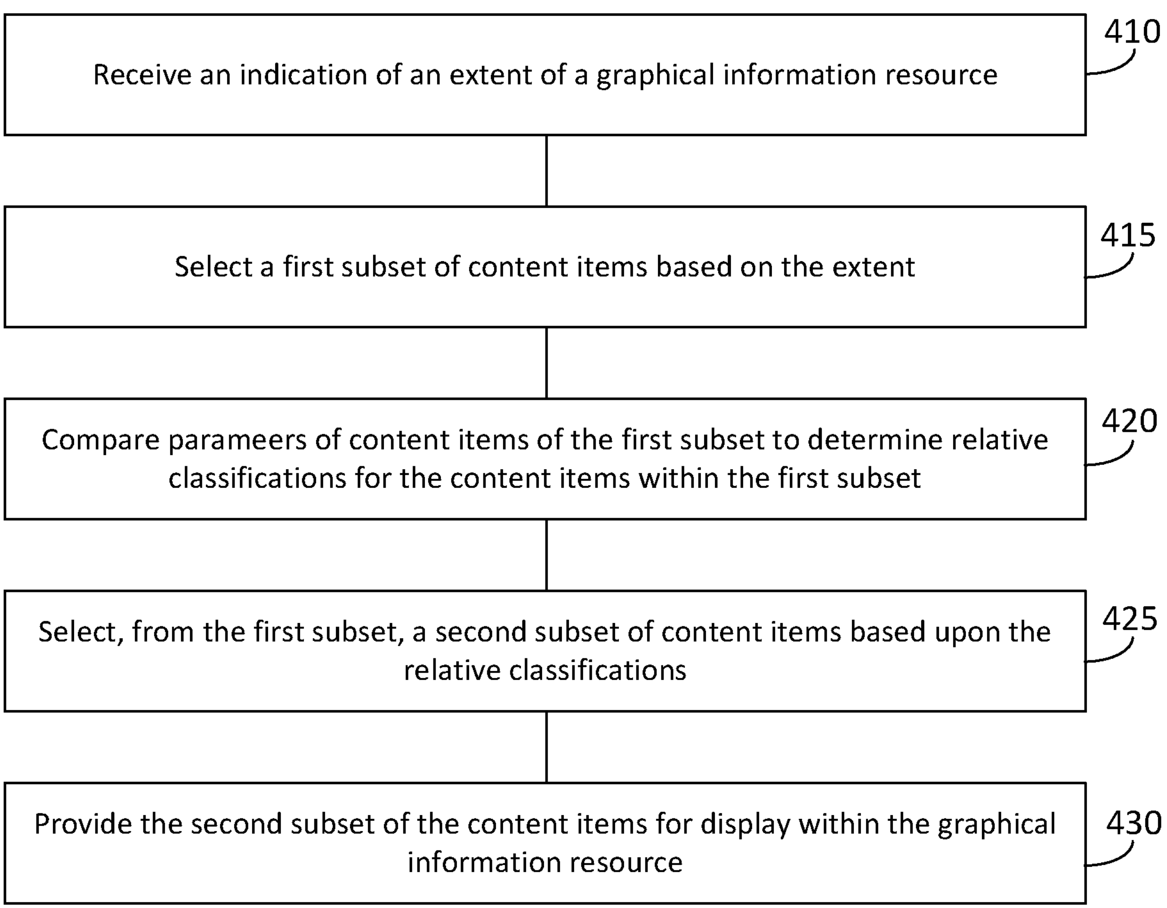
FIG. 4 is an illustration of a method of reducing latency in a graphical environment in accordance with an implementation.

FIG. 4 is an illustration of a method of displaying content within a graphical information resource displayed via a computing device, in accordance with an implementation. The method 400 can be performed via one or more system, component or interface illustrated in FIG. 1, FIG. 2, or FIG. 5, including, e.g., a data processing system, location engine, content selector, classifier, resource monitor, mapping engine, or data repository. In some implementations, the method 400 includes a data processing system receiving an indication of an extent or boundary of a graphical information resource at act 410. At act 415, the data processing system selects a first subset of content items based on the extent. The data processing system can select the first subset of content items that include or are associated with a location that is within the boundary.

At act 420, the data processing system compares parameters (e.g., values or features) of content items of the first subset to determine relative classifications for the content items within the first subset. The data processing system can use a classifier and input parameters that are computed offline or online in real-time (e.g., responsive to a request for content from the computing device). The data processing system can use the parameters to determine a classification that indicates a likelihood of interest (e.g., selection or conversion of the content item). At act 425, the data processing system selects, from the first subset, a second subset of content items based upon the relative classifications. The data processing system can select the second subset as the content items that have a classification score that ranks high. At act 430, the data processing system provides the second subset of the content items for display within the graphical information resource.

Figure 5:
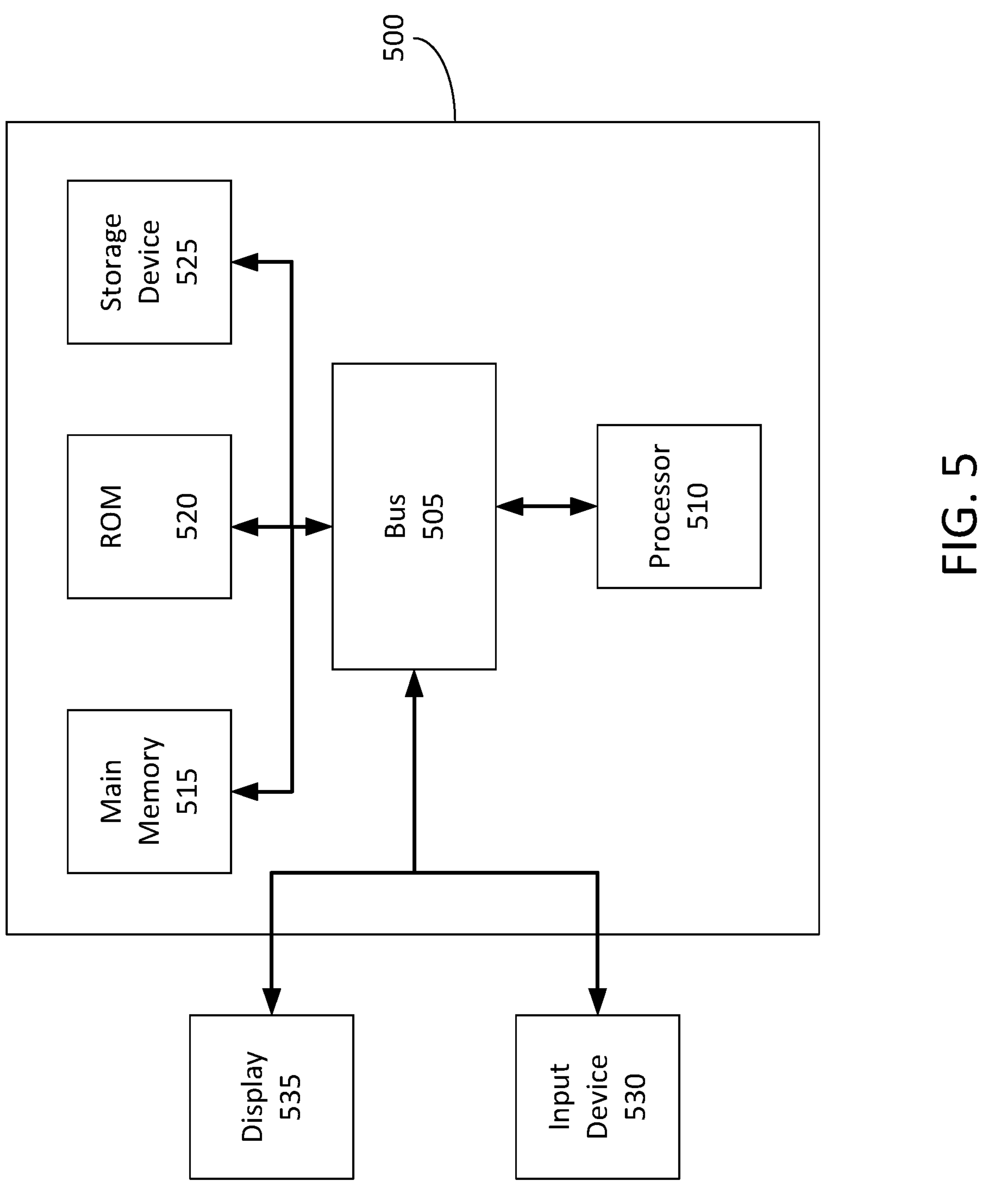
FIG. 5 is a block diagram illustrating a general architecture for a computer system that may be employed to implement various elements of the systems shown in FIGS. 1 and 2, the interface shown in FIG. 3, and the method shown in FIG. 4, in accordance with an implementation.

FIG. 5 is a block diagram of a computer system 500 in accordance with an illustrative implementation. The computer system or computing device 500 can be used to implement the system 100, content provider 125, computing device 110, content publisher 115, data processing system 120, location engine 130, content selector 135, classifier 140, resource monitor 145, mapping engine 150 and data repository 155. The computing system 500 includes a bus 505 or other communication component for communicating information and a processor 510 or processing circuit coupled to the bus 505 for processing information. The computing system 500 can also include one or more processors 510 or processing circuits coupled to the bus for processing information. The computing system 500 also includes main memory 515, such as a random access memory (RAM) or other dynamic storage device, coupled to the bus 505 for storing information, and instructions to be executed by the processor 510. Main memory 515 can also be used for storing position information, temporary variables, or other intermediate information during execution of instructions by the processor 510. The computing system 500 may further include a read only memory (ROM) 520 or other static storage device coupled to the bus 505 for storing static information and instructions for the processor 510. A storage device 525, such as a solid state device, magnetic disk or optical disk, is coupled to the bus 505 for persistently storing information and instructions.

The computing system 500 may be coupled via the bus 505 to a display 535, such as a liquid crystal display, or active matrix display, for displaying information to a user. An input device 530, such as a keyboard including alphanumeric and other keys, may be coupled to the bus 505 for communicating information and command selections to the processor 510. The input device 530 can include a touch screen display 535. The input device 530 can also include a cursor control, such as a mouse, a trackball, or cursor direction keys, for communicating direction information and command selections to the processor 510 and for controlling cursor movement on the display 535.

The processes, systems and methods described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes described herein. One or more processors in a multi-processing arrangement may also be employed to execute the instructions contained in main memory 515. In alternative implementations, hard-wired circuitry may be used in place of or in combination with software instructions to effect illustrative implementations. Thus, implementations arc not limited to any specific combination of hardware circuitry and software.

Although an example computing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources.

The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of reducing latency in a graphical environment provided via information technology infrastructure, comprising:

generating, by a data processing system using an offline process, a first plurality of values for an initial set of content items, each of the first plurality of values indicating a likelihood of interaction with a corresponding content item of the initial set of content items;

storing, by the data processing system in a data structure stored in a memory, the first plurality of values;

subsequent to storing the first plurality of values, receiving, by the data processing system, a content request having no keywords;

receiving, by the data processing system, a location of a computing device;

selecting, by the data processing system and from the initial set of content items, a first plurality of content items each having an entry in a location field that indicates a location within a boundary, the boundary formed from the location of the computing device and defined by a viewable area of the graphical environment;

selecting, by the data processing system and from the first plurality of content items, a second plurality of content items that are assigned to a first category of a plurality of categories based on a load balancing technique and based on at least one of a duration for each of the first plurality of content items, a budget for each of the first plurality of content items, or a resource availability for each of the first plurality of content items;

retrieving, by the data processing system and from the data structure stored in the memory, a second plurality of values that are included in the first plurality of values and correspond to the second plurality of content items;

selecting, by the data processing system, a content item object from the second plurality of content items based on the second plurality of values; and providing, by the data processing system via a network, the content item object to the computing device to cause the computing device to render the content item object in the graphical environment.

2. The method of claim 1, comprising:

forming, by the data processing system, the boundary based on a resolution of the graphical environment.

3. The method of claim 1, comprising:

identifying, by the data processing system, a zoom level of an electronic map in the graphical environment rendered by the computing device; and forming, by the data processing system, the boundary based on the zoom level to identify the first plurality of content items viewable via the graphical environment rendered by the computing device.

4. The method of claim 1, comprising:

receiving, by the data processing system, an indication to zoom an electronic map in the graphical environment; and removing, by the data processing system responsive to the indication, one or more content items from the first plurality of content items that are not viewable.

5. The method of claim 1, the method comprising:

determining, by the data processing system, the duration for each of the first plurality of content items and the resource availability for each of the first plurality of content items; and inputting, by the data processing system, the duration and the resource availability into the load balancing technique to categorize the first plurality of content items into the plurality of categories, wherein the first category ranks higher than a second category based on an output of the load balancing technique.

6. The method of claim 1, comprising:

accessing, by the data processing system, an impression record data structure for the first plurality of content items to retrieve, from a view field, a priority value for each of the first plurality of content items; and determining, by the data processing system, the second plurality of content items from the first plurality of content items based on a combination of the priority value.

7. The method of claim 1, comprising:

determining, by the data processing system using the offline process, the second plurality of values based on historical terms input by a plurality of different computing devices for the location.

8. The method of claim 1, comprising:

determining, by the data processing system using the offline process, the second plurality of values based on a number of HTML requests to access a resource corresponding to each of the second plurality of content items.

9. The method of claim 1, comprising:

determining, by the data processing system using the offline process, the second plurality of values based on a Doppler radar forecast for the location.

10. The method of claim 1, comprising:

selecting, by the data processing system, the content item object using a Bayes classifier.

11. The method of claim 1, comprising:

inputting, by the data processing system, only values generated by the offline process into a Bayes classifier to select the content item object.

12. The method of claim 1, comprising:

identifying, by the data processing system, a bandwidth availability for the computing device;

generating, by the data processing system responsive to the bandwidth availability satisfying a threshold, using an online process, a score for each of the second plurality of content items indicating a likelihood of interaction; and inputting, by the data processing system, the second plurality of values generated using the offline process and the score generated using the online process into a Bayes classifier to select the content item object.

13. The method of claim 1, comprising:

converting a portion of an electronic map in the graphical environment into structured content configured to display the content item object.

14. The method of claim 1, comprising:

receiving, by the data processing system, the content request from the computing device, the content request generated responsive to a location search query comprising a city, a town, or a state, the location search query having no keywords.

15. A system to reduce latency in a graphical environment provided via information technology infrastructure, comprising:

a data processing system comprising one or more processors and a memory;

a location engine of the data processing system to receive a location of a computing device; and a content selector of the data processing system to:

generate, using an offline process, a first plurality of values for an initial set of content items, each of the first plurality of values indicating a likelihood of interaction with a corresponding content item of the initial set of content items;

store, in a data structure stored in the memory, the first plurality of values;

subsequent to storing the first plurality of values, receive a content request having no keywords;

select, from the initial set of content items, a first plurality of content items each having an entry in a location field that indicates a location within a boundary, the boundary formed from the location of the computing device and defined by a viewable area of the graphical environment;

select, from the first plurality of content items, a second plurality of content items that are assigned to a first category of a plurality of categories based on a load balancing technique and based on at least one of a duration for each of the first plurality of content items, a budget for each of the first plurality of content items, or a resource availability for each of the first plurality of content items;

retrieve, from the data structure stored in the memory, a second plurality of values that are included in the first plurality of values and correspond to the second plurality of content items;

select, a content item object from the second plurality of content items based on the second plurality of values; and provide, via a network, the content item object to the computing device to cause the computing device to render the content item object on an electronic map in the graphical environment.

16. The system of claim 15, wherein the data processing system comprises a mapping engine, the data processing system further configured to:

identify a zoom level of the electronic map in the graphical environment rendered by the computing device; and form the boundary based on the zoom level to identify the first plurality of content items viewable via the graphical environment rendered by the computing device.

17. The system of claim 15, wherein the data processing system further comprises a mapping engine, the data processing system further configured to:

receive an indication to zoom the electronic map; and remove, responsive to the indication, one or more content items from the first plurality of content items that are not viewable.

18. The system of claim 15, wherein the data processing system is further configured to:

determine the duration for each of the first plurality of content items and the resource availability for each of the first plurality of content items; and input the duration and the resource availability into the load balancing technique to categorize the first plurality of content items into the plurality of categories, wherein the first category ranks higher than a second category based on an output of the load balancing technique.

19. The system of claim 15, wherein the data processing system is further configured to:

access an impression record data structure for the first plurality of content items to retrieve, from a view field, a priority value for each of the first plurality of content items; and determine the second plurality of content items from the first plurality of content items based on a combination of the priority value.

20. The system of claim 15, wherein the data processing system comprises a classifier, the data processing system further configured to:

select the content item object using a Bayes classification technique.

* * * * *